Dec. 20, 1960     H. W. LEHMAN     2,965,400
COUPLING MECHANISM
Filed July 27, 1959

INVENTOR.
HARRY W. LEHMAN
BY
*Marvin Moody*
ATTORNEY

United States Patent Office 2,965,400
Patented Dec. 20, 1960

2,965,400

COUPLING MECHANISM

Harry W. Lehman, Marion, Iowa, assignor to Collins Radio Company, Cedar Rapids, Iowa, a corporation of Iowa Filed July 27, 1959, Ser. No. 829,597

1 Claim. (Cl. 287—130)

This invention relates in general to shaft coupling mechanisms, and in particular to apparatus for allowing a pair of shafts to be coupled together in relatively inaccessible locations.

At times it is necessary to couple together shafts in relatively inaccessible locations, as for example where a motor must be connected to a driven member. At times it is also necessary that a predetermined angular relationship be maintained between the two shafts.

It is an object of this invention, therefore, to provide a coupling mechanism which allows two shafts to be connected.

Another object of this invention is to provide a coupling means for a pair of shafts which allows shafts mounted in a remote, inaccessible place to be accurately and quickly coupled together.

A feature of this invention is found in the provision for a self-seating shaft coupling mechanism.

Further objects, features, and advantages of the invention will become apparent from the following description and claim when read in view of the drawings, in which:

Figure 1:
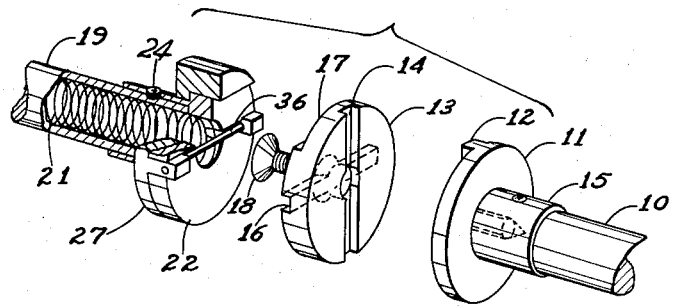
Figure 1 is a partial cut-away view of a shaft coupling mechanism according to this invention.
Figure 2:
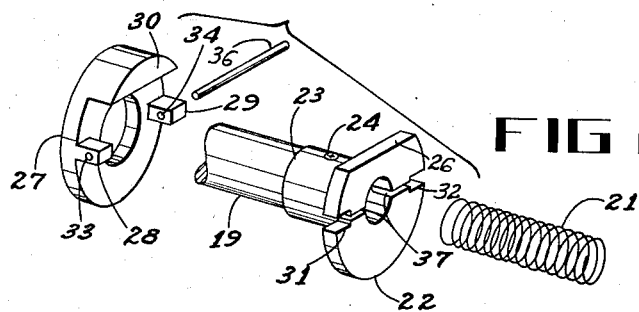
Figure 2 is an exploded view of the one end of the shaft coupling mechanism.
Figure 3:
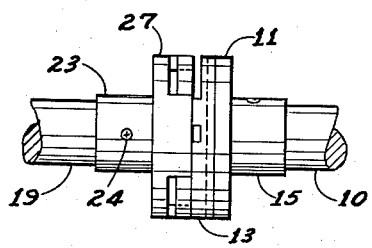
Figure 3 is a side view showing the first and second shafts with the coupling mechanism before engagement; and, Figure 4 is a side view of the coupling mechanism after engagement.
Figure 4:
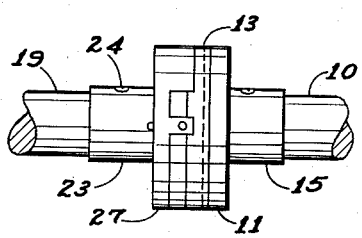

Figure 1 shows a first shaft 10 which has mounted thereon a plate 11 with a rib 12 extending transversely thereacross. The plate 11 has a collar 15 which fits over the end of shaft 10 and is locked thereto by a suitable set screw. An intermediate coupling member 13 is disc-shaped and formed with a slot 14 on one side thereof adapted to engage the rib 12. Member 13 has a second slot 16 on the opposite face. A portion 17 on the opposite face is removed for a purpose to be later explained.

The member 13 has a central opening through which a set screw 18 may be loosely received and which is threadedly received in the end of shaft 10. The set screw 18 has a head large enough to prevent the member 13 from falling from the shaft 10, but the connection is loose so that the rib 12 may longitudinally move in the slot 14 to allow for compensation for misalignment.

A second shaft 19 is formed with an internal opening in which is received a spring 21. A third coupling member 22 is disc-shaped and has a collar 23 which is attached to the shaft 19 by a set screw 24. Disc-shaped member 22 has a portion of the periphery 26 removed for a purpose to be later explained. A fourth coupling member 27 is receivable over the hub 23 and has three projections 28, 29 and 30. The projections 28 and 29 extend through slots 31 and 32 formed in the member 22, and the projection 30 extends past the member 22 due to the removal of the portion 26.

The members 28 and 29 have transverse openings 33 and 34 through which extends a pin 36. The member 22 has a slot 37 formed therein which is adaptable to receive the pin 36. The pin 36 is inserted through the openings 34 and 33 after the spring 21 is inserted into the central opening of shaft 19 and after the members 28 and 29 have been inserted through slots 31 and 32. Thus, the member 27 may be moved relative to the member 22 so that the ends of the projections 29 and 30 are flush with the face of the disc 22.

In operation, the shafts 10 and 19 are placed together and urged together so that the member 27 moves pin 36 against spring 21 until members 28, 29 and 30 are flush with the face of disc 22. This results in the member 27 being slightly backed off from the member 22 due to the misalignment of the projections 28, 29, and 30 with the slot 16 and opening 17. The shaft 19 is then rotated until projection 30 aligns with opening 17 and the projections 28 and 29 align with slot 16. When this occurs the member 27 will snap into position, thus locking the shafts 19 and 10 together for rotary motion. Spring 21 will, of course, urge projections 28, 29, and 30 into the mating openings in the member 13 to accomplish this locking action and maintain it.

It is seen that this invention provides a simple structure for automatically aligning a pair of shafts. Although it has been described with respect to a particular embodiment, it is not to be so limited, as changes and modifications may be made therein which are within the full intended scope of the invention as defined by the appended claim.

I claim:

Apparatus for connecting a pair of shafts comprising a first plate attached to the end of one of said shafts, said first plate formed with a rib on its face away from the end of the shaft, a first disc-shaped coupling member formed with a first slot engageable with the rib on the first plate, a second slot formed on the face of the first coupling member away from the end of the first shaft, a second coupling member attached to the end of the second shaft and formed with means for engaging the second slot in the first coupling member, said means for engaging the second slot movable relative to the second shaft so as to move from a first position out of engagement with the second slot, a portion of the first coupling member on the side opposite the first shaft being removed, and a third projection on the second coupling member receivable in the portion removed from the first coupling member so as to allow the first and second coupling members to mate at only one angular position.

References Cited in the file of this patent

UNITED STATES PATENTS

| | | |
|---|---|---|
| 1,034,249 | Kennington | July 30, 1912 |
| 1,650,557 | Weingartner | Nov. 22, 1927 |
| 2,551,735 | Goff | May 8, 1951 |